US010280791B2

(12) United States Patent
Peters et al.

(10) Patent No.: US 10,280,791 B2
(45) Date of Patent: May 7, 2019

(54) TUNED MASS DAMPER FOR TUBES

(71) Applicant: UNITED TECHNOLOGIES CORPORATION, Farmington, CT (US)

(72) Inventors: Donald W. Peters, Colchester, CT (US); Andreas Sadil, Newington, CT (US); Nico M. Rappoli, Middletown, CT (US); Amarnath Ramlogan, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 350 days.

(21) Appl. No.: 15/207,207

(22) Filed: Jul. 11, 2016

(65) Prior Publication Data

US 2018/0010482 A1    Jan. 11, 2018

(51) Int. Cl.
| F01D 25/04 | (2006.01) |
| F16F 7/02 | (2006.01) |
| F02K 3/10 | (2006.01) |
| F01D 25/16 | (2006.01) |
| F01D 25/30 | (2006.01) |

(Continued)

(52) U.S. Cl.
CPC ........... *F01D 25/04* (2013.01); *F01D 25/162* (2013.01); *F01D 25/30* (2013.01); *F02C 7/20* (2013.01); *F02C 7/22* (2013.01); *F02K 3/10* (2013.01); *F16F 7/023* (2013.01); *F16F 7/116* (2013.01); F05D 2220/323 (2013.01); F05D 2230/237 (2013.01); F05D 2260/96 (2013.01)

(58) Field of Classification Search
CPC .... F02C 7/20; F02C 7/22; F02C 7/222; F01D 25/04; F01D 25/162; F01D 25/30; F02K 3/10; F16F 7/10; F16F 7/104; F16F 7/116; F16F 15/02; F16F 7/02; F16F 7/023; F05D 2240/61; F05D 2260/96
See application file for complete search history.

(56) References Cited

U.S. PATENT DOCUMENTS

2009/0317236 A1* 12/2009 Hardwicke ............. C23C 30/00
    415/119
2012/0067449 A1*  3/2012 Pesek ...................... F04D 13/08
    138/106

(Continued)

FOREIGN PATENT DOCUMENTS

JP      S57134040      8/1982

OTHER PUBLICATIONS

European Patent Office, European Partial Search Report dated Feb. 26, 2018 in Application No. 17170671.6-1007.

(Continued)

*Primary Examiner* — Steven M Sutherland
*Assistant Examiner* — Jacek Lisowski
(74) *Attorney, Agent, or Firm* — Snell & Wilmer, L.L.P.

(57) ABSTRACT

A tuned mass damper for reducing vibration on a component includes a shaft connector member configured to be coupled to the component and a cable termination member. The tuned mass damper also includes at least one cable coupled to the shaft connector member and to the cable termination member such that vibration of the component is transferred to the at least one cable via the shaft connector member and increased or decreased by the at least one cable.

20 Claims, 7 Drawing Sheets

(51) Int. Cl.
    *F02C 7/20*           (2006.01)
    *F02C 7/22*           (2006.01)
    *F16F 7/116*         (2006.01)

(56) References Cited

U.S. PATENT DOCUMENTS

| | | | |
|---|---|---|---|
| 2013/0091849 A1* | 4/2013 | Sadil | F02K 3/10 |
| | | | 60/761 |
| 2013/0092489 A1 | 4/2013 | Hagelin | |
| 2013/0139512 A1 | 6/2013 | Sadil | |
| 2014/0096537 A1* | 4/2014 | McMahon | F02C 7/20 |
| | | | 60/796 |
| 2016/0123422 A1 | 5/2016 | Keinanen | |

OTHER PUBLICATIONS

Isolation Dynamics Corp—Shock & Vibration Specialist Helical Cable Isolator, . . . website www.isolator.com, 1 page, Jul. 11, 2016.

\* cited by examiner

TUNED MASS DAMPER FOR TUBES

GOVERNMENT LICENSE RIGHTS

This disclosure was made with government support under contract F33657-91-C-0007, which was awarded by the United States Air Force. The government has certain rights in the disclosure.

FIELD

The present disclosure is directed to a tuned mass damper coupled to a shaft and tuned to reduce vibrations at a resonant frequency of the shaft.

BACKGROUND

Exhaust from turbine sections of gas turbine engines may include uncombusted oxygen gas (O2). Similarly, if the gas turbine engine is a bypass engine, the bypass air also contains oxygen gas. Some gas turbine engines may include an augmentor section capable of providing afterburning capabilities. In these gas turbine engines, a turbine exhaust case may output additional fuel that mixes with the exhaust from the turbine section and/or the bypass air. The mixture of fuel and exhaust/bypass air may be combusted in the augmentor section. This secondary combustion further increases the thrust of the gas turbine engine by increasing velocity of the fluid exiting the gas turbine engine.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Disclosed herein is a tuned mass damper for increasing or decreasing vibration on a component. The tuned mass damper includes a shaft connector member configured to be coupled to the component and a cable termination member. The tuned mass damper also includes at least one cable coupled to the shaft connector member and to the cable termination member such that vibration of the component is transferred to the at least one cable via the shaft connector member and increased or decreased by the at least one cable.

In any of the foregoing tuned mass dampers, the component is a shaft and the cable termination member is configured to be annularly positioned about the shaft, wherein the cable termination member and the shaft define a gap.

In any of the foregoing tuned mass dampers, the tuned mass damper is tuned to have a damper frequency that reduces vibrations at a resonant frequency of the component.

In any of the foregoing tuned mass dampers, the tuned mass damper is tuned by adjusting at least one of a length of the at least one cable, a mass of the cable termination member, a total number of cables, a total number of strands of the at least one cable, a diameter of the at least one cable, or a material of the at least one cable.

In any of the foregoing tuned mass dampers, the component is a shaft of an augmentor spray bar of a gas turbine engine.

In any of the foregoing tuned mass dampers, each of the shaft connector member, the at least one cable, and the cable termination member include at least one of a nickel-chromium-based alloy or a stainless steel.

In any of the foregoing tuned mass dampers, the shaft connector member includes a first portion and a second portion configured to be positioned about the component and coupled together to annularly surround a portion of the component.

In any of the foregoing tuned mass dampers, the first portion and the second portion of the shaft connector member are configured to be coupled together via at least one of welding, brazing, or a physical connector.

Also described is in augmentor spray bar for use in a gas turbine engine. The augmentor spray bar includes a tubular shaft that defines a fuel passageway through which fuel may flow. The augmentor spray bar also includes a fuel jet coupled to the shaft and designed to receive the fuel from the fuel passageway and to output the fuel. The augmentor spray bar also includes a tuned mass damper that has a shaft connector member coupled to the shaft, a cable termination member, and at least one cable coupled to the shaft connector member and to the cable termination member such that vibration of the shaft is transferred to the at least one cable via the shaft connector member and dampened by the at least one cable.

In any of the foregoing augmentor spray bars, the cable termination member is positioned annularly about the shaft and the cable termination member and the shaft define a gap.

In any of the foregoing augmentor spray bars, the tuned mass damper is tuned to have a damper frequency that reduces vibrations at a resonant frequency of the shaft.

In any of the foregoing augmentor spray bars, the tuned mass damper is tuned by adjusting at least one of a length of the at least one cable, a mass of the cable termination member, a total number of cables, a total number of strands of the at least one cable, a diameter of the at least one cable, or a material of the at least one cable.

In any of the foregoing augmentor spray bars, each of the shaft connector member, the at least one cable, and the cable termination member include at least one of a nickel-chromium-based alloy or a stainless steel.

In any of the foregoing augmentor spray bars, the shaft connector member includes a first portion and a second portion configured to be positioned about the shaft and coupled together.

Also described is a strut box for use in a turbine exhaust case of a gas turbine engine having afterburning capabilities. The strut box includes a casing defining a cavity the strut box also includes an augmentor spray bar at least partially positioned within the cavity and having a shaft. The strut box also includes a tuned mass damper that has a shaft connector member positioned annularly about the shaft and coupled to the shaft. The tuned mass damper also has a cable termination member positioned annularly about the shaft. The tuned mass damper also has at least one cable coupled to the shaft connector member and to the cable termination member such that vibration of the shaft is transferred to the at least one cable via the shaft connector member and dampened by the at least one cable.

In any of the foregoing strut boxes, the cable termination member and the shaft define a gap.

In any of the foregoing strut boxes, the tuned mass damper is tuned to have a damper frequency that reduces vibrations at a resonant frequency of the shaft.

In any of the foregoing strut boxes, the tuned mass damper is tuned by adjusting at least one of a length of the at least one cable, a mass of the cable termination member, a total number of cables, a total number of strands of the at least one cable, a diameter of the at least one cable, or a material of the at least one cable.

In any of the foregoing strut boxes, each of the shaft connector member, the at least one cable, and the cable termination member include at least one of a nickel-chromium-based alloy or a stainless steel.

In any of the foregoing strut boxes, the shaft connector member includes a first portion and a second portion configured to be positioned about the shaft and coupled together.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

Figure 1:
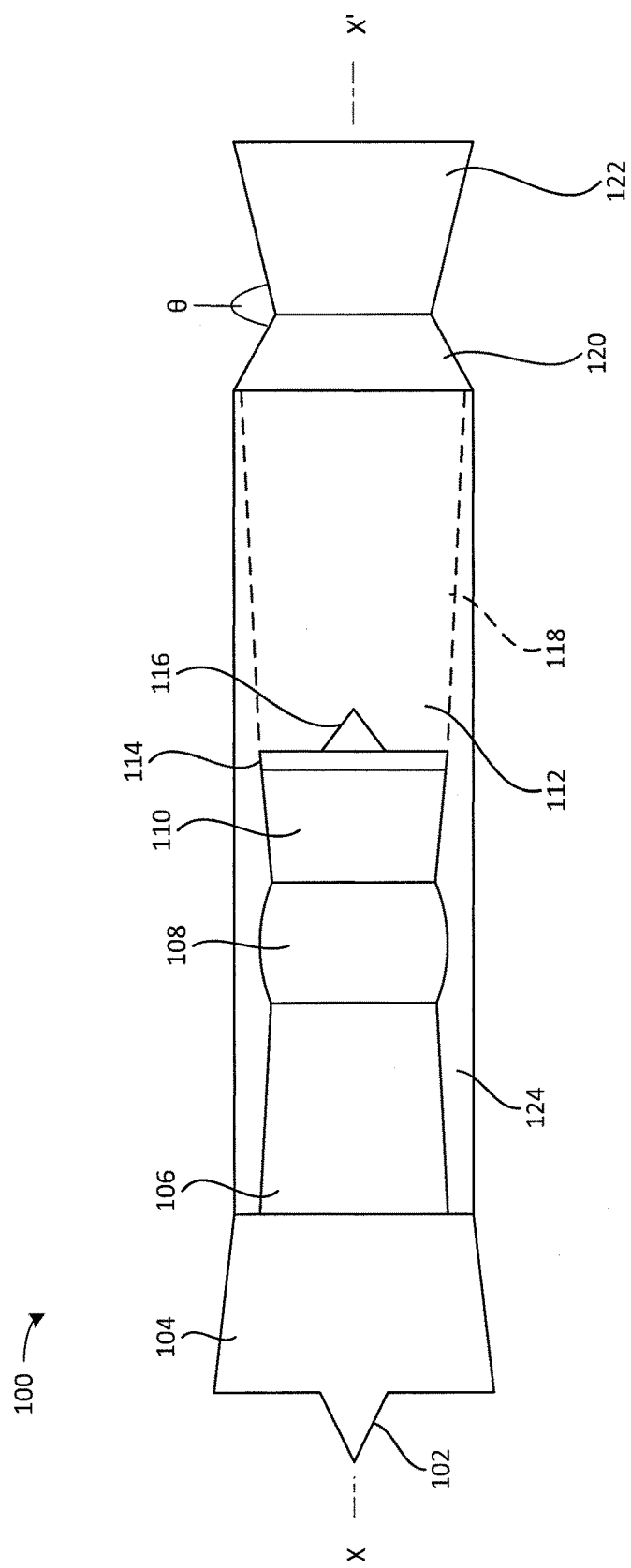
FIG. 1 is a schematic cross-section of a gas turbine engine having an augmentor section, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step.

Surface shading lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

Referring now to FIG. 1, a gas turbine engine 100 having afterburning capabilities may include a nose cone 102, a fan section 104, a compressor section 106, a combustor section 108, a turbine section 110, an augmentor section 112, and a turbine exhaust case (TEC) 114. Gas turbine engine 100 may also include a tail cone 116, an augmentor liner 118, a nozzle convergent section 120, a nozzle divergent section 122, and bypass ducts 124.

Nose cone 102 may improve the aerodynamics of gas turbine engine 100. Nose cone 102 may also provide vibration control functions.

Fan section 104 may include a plurality of fan blades that rotate about an axis X-X' of gas turbine engine 100 and propel fluid (such as air) aftward towards compressor section 106 and bypass ducts 124. In that regard, a portion of the air propelled aftward by fan section 104 may be received by compressor section 106 and a portion of the air propelled aftward by fan section 104 may be received by bypass ducts 124.

The air received by compressor section 106 may be compressed using a plurality of stages of rotors that rotate about axis X-X'. Compressor section 106 may include stators for turning the airflow in a desired direction to increase efficiency of compressor section 106.

Combustor section 108 may receive the compressed air and fuel and may provide a chamber in which the air and fuel mix. Combustor section 108 may also include an ignition source. The mixture of air and fuel may be ignited, creating a flow of exhaust in the aft direction. The exhaust may include compounds created during the combustion and residual oxygen gas that did not react during the combustion.

Turbine section 110 may include multiple stages of blades and vanes. The exhaust created by combustor section 108 is received by turbine section 110. In response to receiving the exhaust, the turbine blades rotate, creating torque. The torque created in turbine section 110 may then be mechanically transferred to the plurality of fan blades in fan section 104 and/or to rotors in compressor section 106.

Augmentor liner 118 may include a material defining a plurality of holes such that fluid may pass from one side of augmentor liner 118 to the other side of augmentor liner. In that regard, augmentor section 112 may receive the air flowing through bypass ducts 124 via augmentor liner 118.

Exhaust from turbine section 110 may flow through TEC 114 where fuel may be added to the exhaust. The combination of exhaust and fuel from TEC 114 and bypass air from bypass ducts 124 may be ignited.

The exhaust from turbine section 110 and the bypass air from bypass ducts 124 has an aftward velocity. After combustion in augmentor section 112, a second exhaust is generated having a higher aftward velocity than the turbine exhaust and bypass air. Thus, more thrust is generated when combustion occurs in augmentor section 112 than when combustion does not occur in augmentor section 112.

Tail cone 116 may direct the flow from TEC 114 towards augmentor section 112. Tail cone 116 may also provide vibration control functions.

In various embodiments, an angle θ of nozzle convergent section 120 relative to nozzle divergent section 122 can be controlled. In that regard, nozzle convergent section 120 and/or nozzle divergent section 122 can be controlled to provide tunable acceleration of exhaust based on whether or not combustion occurs in augmentor section 112.

Figure 2A:
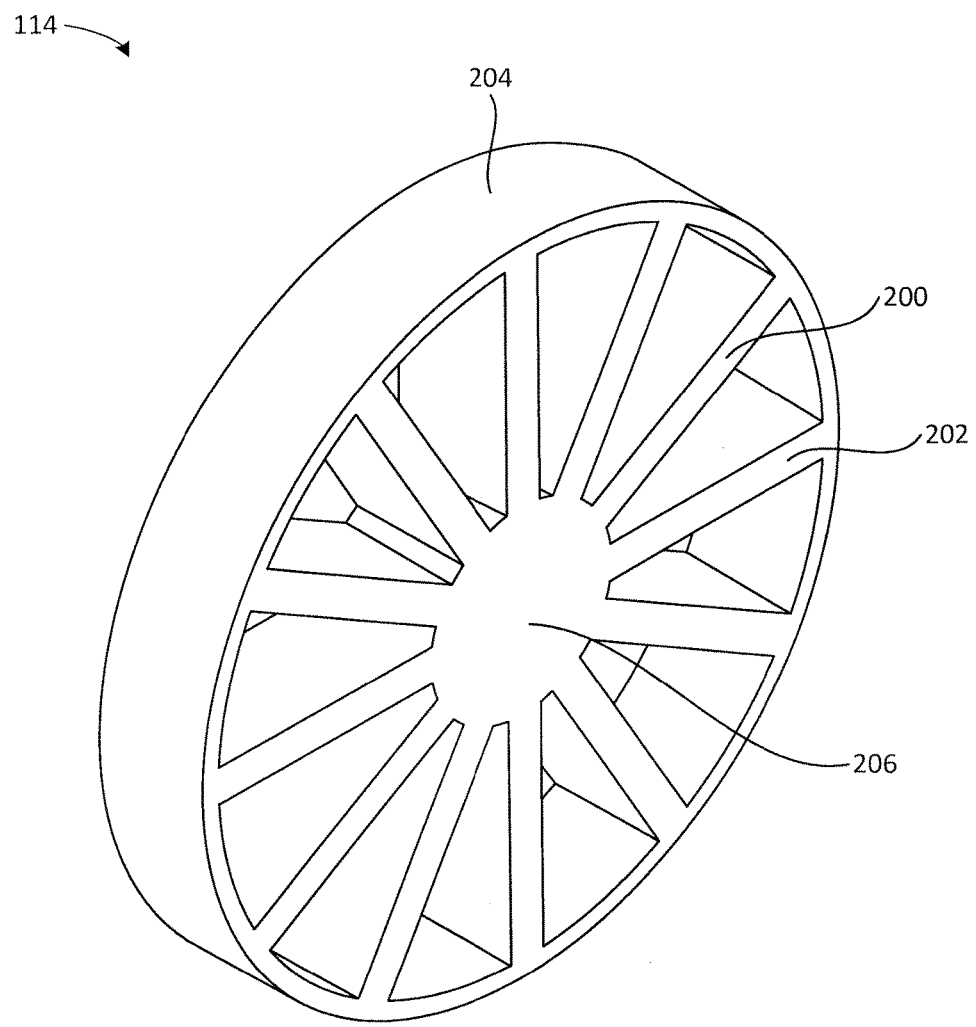
FIG. 2A is a drawing of a turbine exhaust case of the gas turbine engine of FIG. 1 having a plurality of strut boxes, in accordance with various embodiments.

Turning to FIG. 2A, TEC 114 includes an outer annular casing 204, an inner structure 206, and a plurality of strut boxes 200, including a strut box 202, extending between the outer annular casing 204 and the inner structure 206. Strut box 202 may be coupled to outer annular casing 204 only, may be coupled to inner structure 206 only, or may be coupled to outer annular casing 204 and inner structure 206.

Figure 2B:
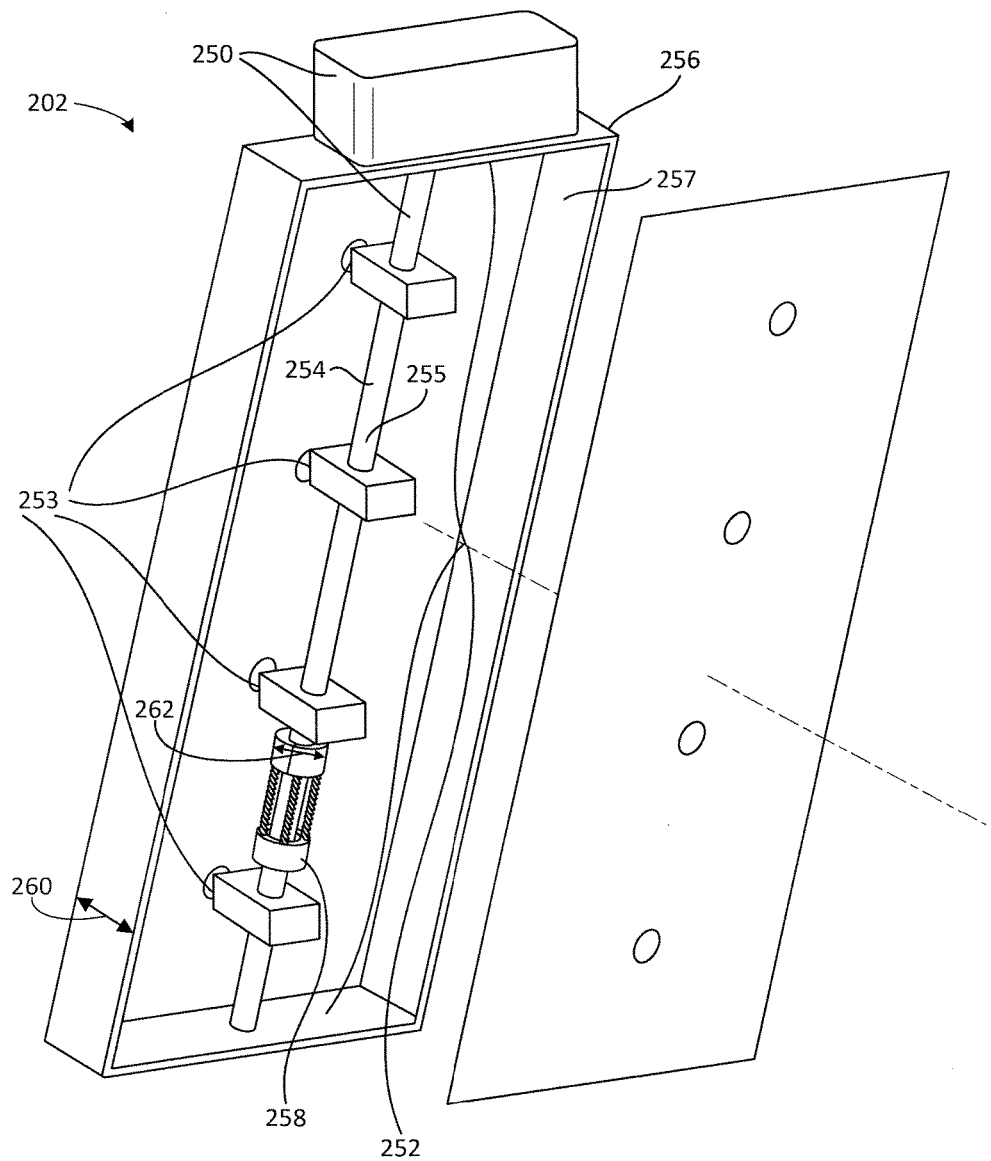
FIG. 2B is a drawing illustrating internal components of a strut box of the turbine exhaust case of FIG. 2A, in accordance with various embodiments.

Turning now to FIGS. 2A and 2B, each of the plurality of strut boxes 200 may include an augmentor spray bar. For example, strut box 202 may include a casing 256 that defines a cavity 257 and an augmentor spray bar 250 at least partially positioned within cavity 257. Augmentor spray bar 250 may include a cantilever portion 252 which may be coupled to casing 256.

Referring now to FIG. 2B, augmentor spray bar 250 may also include a shaft 254 and a plurality of fuel jets 253 coupled to shaft 254. Shaft 254 may define a fuel passageway 255 which may receive fuel. Fuel within fuel passageway 255 may be received by each of the plurality of fuel jets 253. Each of the plurality of fuel jets 253 may be controllable to output fuel to be received by augmentor section 112 of FIG. 1 for afterburning purposes.

In response to operation of gas turbine engine 100 of FIG. 1, strut box 202 and, in particular augmentor spray bar 250, may experience vibration. Occasionally, this vibration may have a frequency similar to a resonant frequency of augmentor spray bar 250. In response to the frequency of vibration experienced by strut box 202 being similar to the resonant frequency of augmentor spray bar 250, vibration of augmentor spray bar 250 may undesirably increase in magnitude. In that regard, augmentor spray bar 250 may include a tuned mass damper 258 and/or tuned mass damper 258 may be assembled onto augmentor spray bar 250.

Tuned mass damper 258 may be tuned to have a damping effect on vibrations having a frequency similar to the resonant frequency of augmentor spray bar 250. In that regard, in response to strut box 202 experiencing vibrations at a frequency similar to the resonant frequency of augmentor spray bar 250, tuned mass damper 258 may reduce or eliminate any change in magnitude of the vibration that would otherwise be experienced by augmentor spray bar 250.

Tuned mass damper 258 may have a maximum diameter 262. Maximum diameter 262 may be less than a distance 260 of casing 256 such that tuned mass damper 258 and augmentor spray bar 250 may fit within cavity 257.

Figure 3:
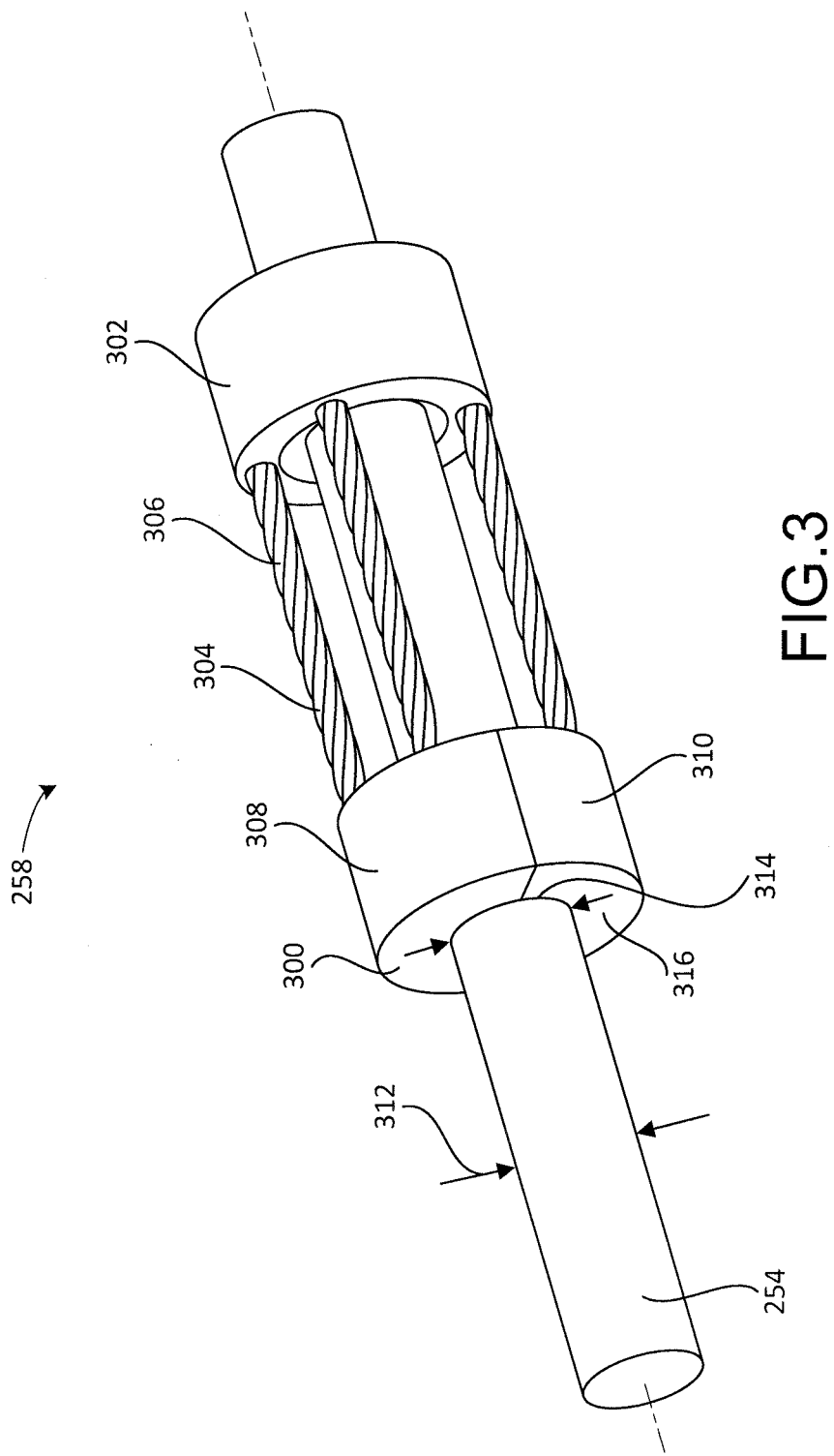
FIG. 3 is a drawing of a tuned mass damper for use in the strut box of FIG. 2B, in accordance with various embodiments.

Turning now to FIG. 3, tuned mass damper 258 may include a shaft connector member 300, a cable termination member 302, and at least one cable 304 including a cable 306. Cable 306 may be coupled to shaft connector member 300 and cable termination member 302 by, for example, welding, brazing, swedging, crimping, or the like.

Shaft connector member 300 may be coupled to shaft 254 via, for example, a friction fit, welding, brazing, mechanical attachment, or the like. In various embodiments, shaft connector member 300 may be integrally formed with shaft 254.

In various embodiments, shaft connector member 300 may include a first portion 308 and a second portion 310. First portion 308 and second portion 310 may each have a semi-annular shape. In that regard, first portion 308 and second portion 310 may be positioned about shaft 254 such that together first portion 308 and a second portion 310 surround a portion of a circumference of shaft 254.

First portion 308 and second portion 310 may be coupled together via, for example, brazing, welding, mechanical attachment as described below, or the like. In various embodiments, first portion 308 and second portion 310 may be integrally formed such that shaft connector member 300 includes a single piece of material. In response to first portion 308 being coupled to second portion 310 about shaft 254, shaft connector member 300 may be coupled to shaft 254 via a friction fit.

For example, shaft connector member 300 may define an aperture 314 designed to receive shaft 254. Aperture 314 may have a diameter 316. Similarly, shaft 254 may have a diameter 312. Diameter 312 and diameter 316 may be similar, such as within 2 percent (2%), 1%, or 0.5% of each other. In order to prevent damage to shaft connector member 300 and/or shaft 254, and to prevent movement of shaft connector member 300 relative to shaft 254, a material of shaft connector member 300 may have a similar coefficient of thermal expansion as a material of shaft 254. For example, a coefficient of thermal expansion of shaft connector member 300 may be within 5%, 2%, or 1% of a coefficient of thermal expansion of shaft 254.

In various embodiments, each of shaft 254, shaft connector member 300, and cable termination member 302 may include one or more of an austenitic nickel-chromium-based alloy such as that sold under the trademark Inconel® which is available from Special Metals Corporation of New Hartford, N.Y., USA, a stainless steel, or other material capable of withstanding the pressures and temperatures experienced by TEC 114. For example, shaft 254 and shaft connector member 300 may include Inconel® and cable termination member 302 may include a stainless steel. In various embodiments, cable 306 may include a stainless steel or other material capable of withstanding the pressures and temperatures experienced by TEC 114.

Referring now to FIGS. 2A, 2B, and 3, shaft connector member 300 may be positioned radially inward relative to cable termination member 302 (i.e., shaft connector member 300 may be closer to inner structure 206 than a cable termination member 302) or shaft connector member 300 may be positioned radially outward relative to cable termination member 302. Furthermore, tuned mass damper 258 may be positioned at any location along augmentor spray bar 250 such as between two of the plurality of fuel jets 253 as shown, between one of the plurality of fuel jets 253 and casing 256, or outside of casing 256 relative to the plurality of fuel jets 253.

As augmentor spray bar 250 experiences vibration having a frequency similar to the resonant frequency of augmentor spray bar 250, the vibration travels through shaft connector member 300 and is received by cable 306 and cable termination member 302 where the vibration is dampened.

Figure 4:
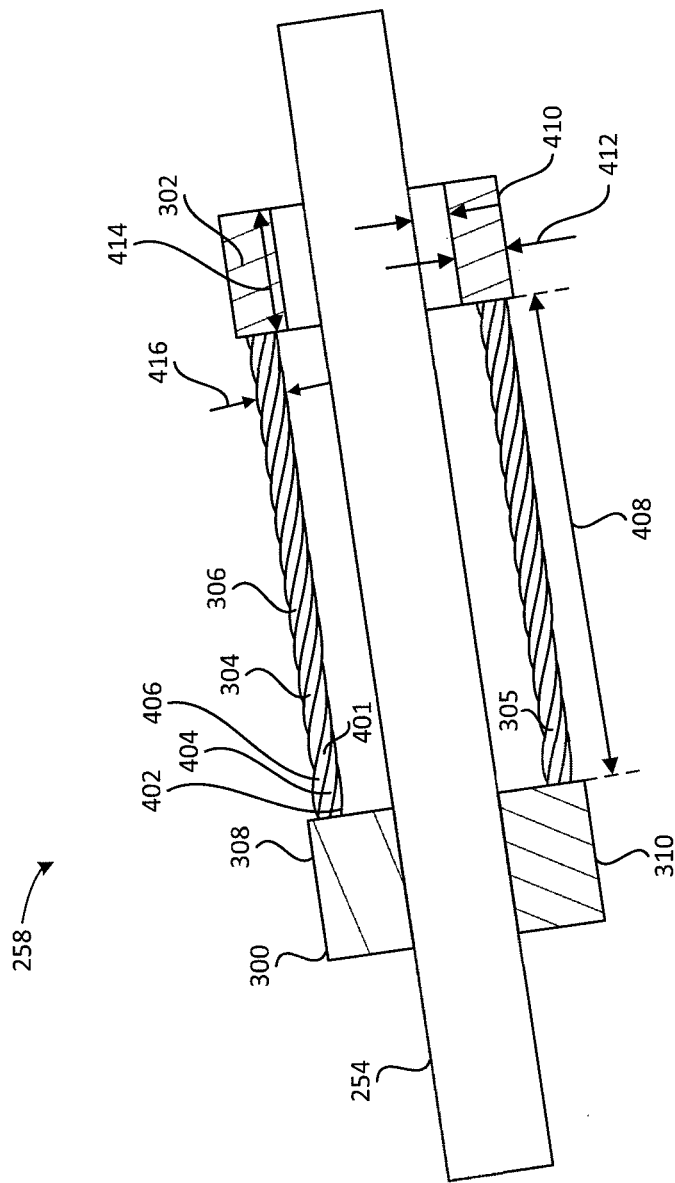
FIG. 4 is a cross-sectional view of the tuned mass damper of FIG. 3, in accordance with various embodiments.

Turning now to FIG. 4, a cross-sectional view of tuned mass damper 258 illustrates various features of tuned mass damper 258 that can be tuned to adjust the frequency at which vibrations received by tuned mass damper will be reduced (i.e., tuned to adjust the frequency response of tuned mass damper 258).

Cable 304 has a length 408 extending between shaft connector member 300 and cable termination member 302. The length 408 of cable 304 may be increased or decreased to adjust the frequency response of tuned mass damper 258. For example, the length 408 of cable 304 may be between 2.54 centimeters (2.54 cm, 1 inch) and 30.5 cm (12 inches), between 2.54 cm (1 inch) and 15.2 cm (6 inches), or between 2.54 cm (1 inch) and 7.62 cm (3 inches).

At least one cable 304 may include a plurality of cables 305. A total number of cables of plurality of cables 305 may be increased or decreased to adjust the frequency response of tuned mass damper 258. For example, plurality of cables 305 may include between 1 and 12 cables, between 3 and 8 cables, or between 3 and 5 cables.

Each of plurality of cables 305 may include a plurality of strands 401. For example, cable 306 includes a first strand 402, a second strand 404, and a third strand 406. Each strand of plurality of strands 401 may rub against each other during vibration, converting motion into heat (i.e., causing friction). This friction dissipates the vibration energy, thus damping the vibration experienced by tuned mass damper 258.

The total number of strands of plurality of strands 401 may be increased or decreased to adjust the frequency response of tuned mass damper 258. For example, plurality of strands 401 may include between 1 strand and 50 strands, between 3 strands and 25 strands, or between 5 strands and 10 strands.

Cable termination member 302 may have a length 414 and a thickness 412. A mass of cable termination member 302 may be based on length 414, thickness 412, and a density of the material of cable termination member 302. The mass of cable termination member 302 may be increased or decreased to change the frequency response of tuned mass damper 258.

In that regard, at least one of the material of cable termination member 302, the length 414 of cable termination member 302, or the thickness 412 of cable termination member 302 may be changed in order to adjust the frequency response of tuned mass damper 258. For example, length 414 of cable termination member 302 may be between 0.254 cm (0.1 inch) and 7.62 cm (3 inches), between 0.762 cm (0.3 inches) and 5.08 cm (2 inches), or between 1.27 cm (0.5 inches) and 2.54 cm (1 inch). For example, thickness 412 of cable termination member 302 may be between 0.254 cm (0.1 inch) and 7.62 cm (3 inches), between 0.762 cm (0.3 inches) and 5.08 cm (2 inches), or between 1.27 cm (0.5 inches) and 2.54 cm (1 inch).

Cable 306 may have a diameter 416. Diameter 416 of cable 306 may be increased or decreased in order to adjust the frequency response of tuned mass damper 258. For example, diameter 416 of cable 306 may be between 0.0254 cm (0.01 inch) and 2.54 cm (1 inch), between 0.254 cm (0.1 inch) and 1.27 cm (0.5 inches), or between 0.508 cm (0.2 inches) and 1.02 cm (0.4 inches).

As described above, cable 306 may be made of a material such as stainless steel. Different materials provide different properties and, thus, the material of cable 306 may be changed in order to adjust the frequency response of tuned mass damper 258.

As shown, cable termination member 302 may be separated from shaft 254 by a gap 410. Gap 410 may be sufficiently large that cable termination member 302 may not contact shaft 254 when tuned mass damper 258 is dampening vibration of shaft 254. For example, gap 410 may be between 0.254 cm (0.1 inch) and 7.62 cm (3 inches), between 0.762 cm (0.3 inches) and 5.08 cm (2 inches), or between 1.27 cm (0.5 inches) and 2.54 cm (1 inch).

Referring briefly to FIGS. 2A and 4, each of the plurality of strut boxes 200 may include a tuned mass damper such as tuned mass damper 258. In that regard, cable 306 may be sufficiently stiff that cable termination member 302 remains separated from shaft 254 by gap 410 regardless of the orientation of tuned mass damper 258 relative to a ground surface and, thus, the effects of gravity.

Figure 5:
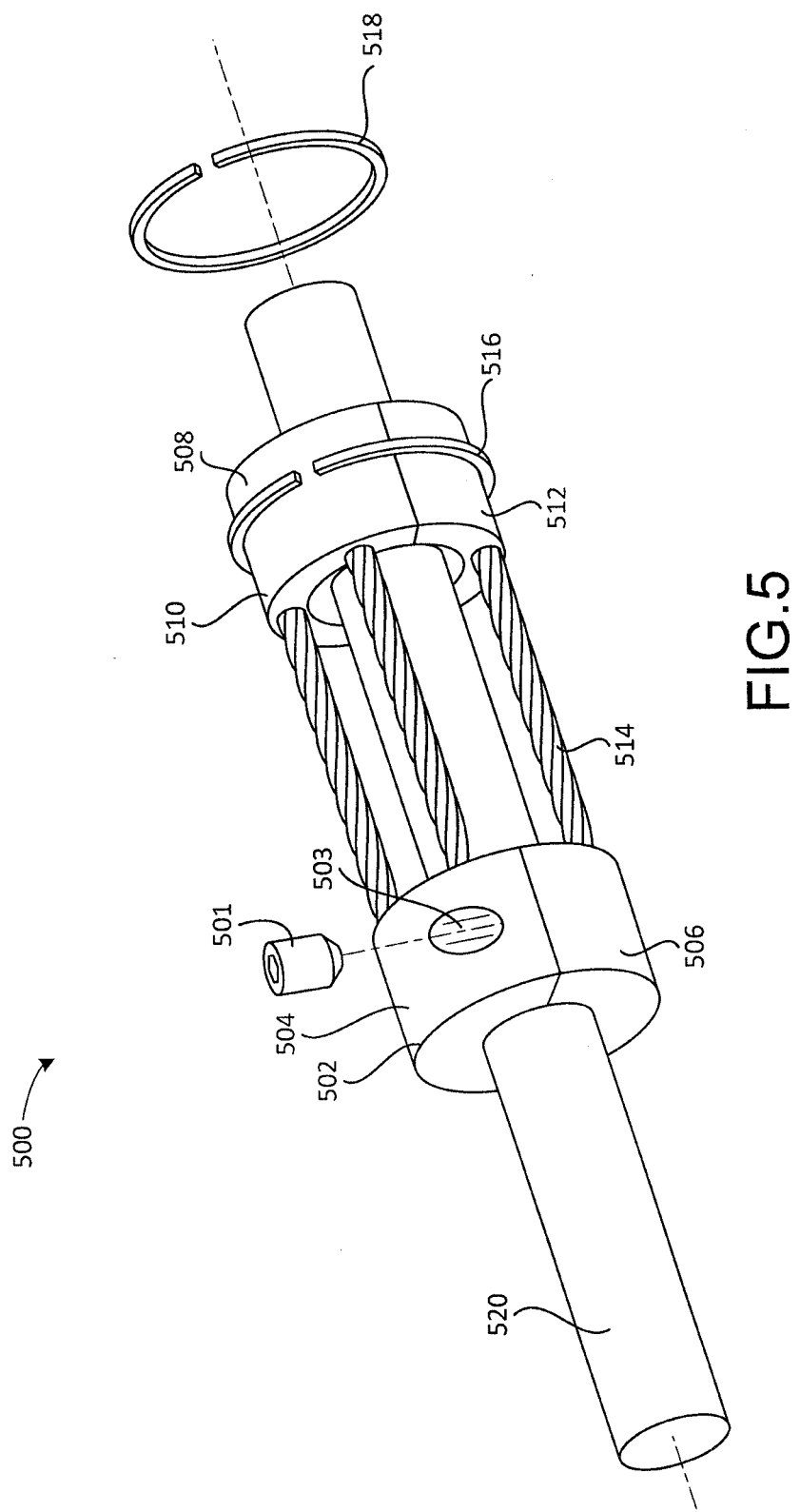
FIG. 5 is a drawing of another tuned mass damper for use in a strut box of a turbine exhaust case, in accordance with various embodiments.

Turning now to FIG. 5, another tuned mass damper 500 may include a shaft connector member 502 coupled to a shaft 520, a cable termination member 508, and a plurality of cables 514. Shaft connector member 502 may include a first portion 504 and a second portion 506. First portion 504 and second portion 506 of shaft connector member 502 may be coupled together via a connector 501.

For example, at least one of first portion 504 or second portion 506 may define a connector aperture 503. In various embodiments, connector aperture 503 may include threading. In that regard, connector 501 may include a set screw designed to be received by connector aperture 503 to couple first portion 504 to second portion 506. In various embodiments, a mechanical connection between the first portion 504 and second portion 506 may be made via rivets 501 or other types of connectors.

Cable termination member 508 may also include a first portion 510 and a second portion 512. First portion 510 and second portion 512 may be coupled together via, for example, welding, brazing, a mechanical connection such as a set screw, or the like. In various embodiments, first portion 510 and second portion 512 may be held in place relative to each other by one or more snap ring 516 positioned about an outer circumference of cable termination member 508. Snap ring 516 may reduce the likelihood of first portion 510 separating from second portion 512. In various embodiments, a second snap ring 518 may be positioned about the circumference of cable termination member 508 to further reduce the likelihood of first portion 510 separating from second portion 512.

Figure 6:
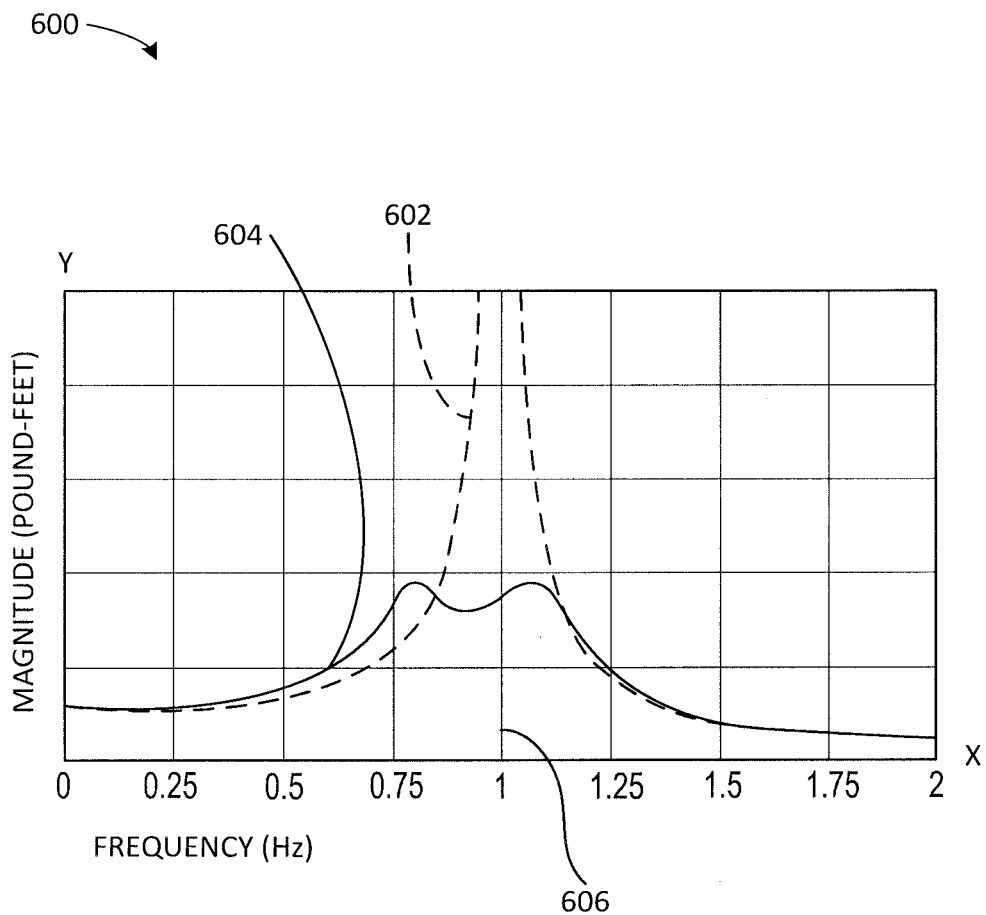
FIG. 6 is a graph illustrating the effects of the tuned mass damper of FIG. 3, in accordance with various embodiments.

Turning now to FIGS. 3 and 6, a graph 600 illustrates the effects of tuned mass damper 258 on shaft 254. The X axis of graph 600 illustrates a frequency of vibration experienced by shaft 254 and the y-axis illustrates a magnitude of the vibration. A first line 602 illustrates vibration on shaft 254 without use of tuned mass damper 258. As shown in the graph 600, the resonant frequency of shaft 254 may be one hertz. Thus, as the frequency of vibration approaches one hertz, the magnitude of the vibration may increase exponentially.

A second line 604 illustrates vibration on shaft 254 with use of tuned mass damper 258. As the frequency gets within 0.25 hertz of the one hertz resonant frequency of shaft 254, the magnitude of the vibration begins to increase. However, as the frequency gets closer to one hertz, tuned mass damper 258 begins to dampen the vibrations and, thus, the magnitude of the vibration decreases. This reduction in magnitude is achieved because tuned mass damper 258 has been tuned to have a frequency response of about one hertz (i.e., within 5% or within 10% or within 20% of one hertz), which is similar to the resonant frequency of shaft 254.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A tuned mass damper for increasing or decreasing vibration on a component, comprising:
   a shaft connector member configured to be coupled to the component;
   a cable termination member; and
   a cable having a plurality of strands, the cable coupled to the shaft connector member and to the cable termination member such that vibration of the component is transferred to the plurality of strands of the cable via the shaft connector member and the plurality of strands are configured to generate heat by vibrating against one another.

2. The tuned mass damper of claim 1, wherein the component is a shaft and the cable termination member is configured to be annularly positioned about the shaft, and wherein a gap exists between the cable termination member and the shaft.

3. The tuned mass damper of claim 1, wherein the tuned mass damper is tuned to have a damper frequency that reduces vibrations at a resonant frequency of the component.

4. The tuned mass damper of claim 1, wherein the tuned mass damper is tuned by adjusting at least one of a length of the cable, a mass of the cable termination member, a total number of strands of the cable, a diameter of the cable, or a material of the cable.

5. The tuned mass damper of claim 1, wherein the component is a shaft of an augmentor spray bar of a gas turbine engine.

6. The tuned mass damper of claim 1, wherein each of the shaft connector member, the cable, and the cable termination member include at least one of a nickel-chromium-based alloy or a stainless steel.

7. The tuned mass damper of claim 1, wherein the shaft connector member includes a first portion and a second portion configured to be positioned about the component and coupled together to annularly surround a portion of the component.

8. The tuned mass damper of claim 7, wherein the first portion and the second portion of the shaft connector member are configured to be coupled together via at least one of welding, brazing, or a physical connector.

9. An augmentor spray bar for use in a gas turbine engine, comprising:
   a tubular shaft defining a fuel passageway through which fuel may flow;
   a fuel jet coupled to the tubular shaft and configured to receive the fuel from the fuel passageway and to output the fuel; and
   a tuned mass damper having:
   a shaft connector member configured to be coupled to the tubular shaft,
   a cable termination member, and
   a cable having a plurality of strands, the cable coupled to the shaft connector member and to the cable termination member such that vibration of the tubular shaft is transferred to the plurality of strands of the cable via the shaft connector member and the plurality of strands are configured to generate heat by vibrating against one another.

10. The augmentor spray bar of claim 9, wherein the cable termination member is positioned annularly about the tubular shaft and wherein a gap exists between the cable termination member and the tubular shaft.

11. The augmentor spray bar of claim 9, wherein the tuned mass damper is tuned to have a damper frequency that reduces vibrations at a resonant frequency of the tubular shaft.

12. The augmentor spray bar of claim 9, wherein the tuned mass damper is tuned by adjusting at least one of a length of the cable, a mass of the cable termination member, a total number of strands of the cable, a diameter of the cable, or a material of the cable.

13. The augmentor spray bar of claim 9, wherein each of the shaft connector member, the cable, and the cable termination member include at least one of a nickel-chromium-based alloy or a stainless steel.

14. The augmentor spray bar of claim 9, wherein the shaft connector member includes a first portion and a second portion configured to be positioned about the tubular shaft and coupled together.

15. A strut box for use in a turbine exhaust case of a gas turbine engine having afterburning capabilities, comprising:
a casing defining a cavity;
an augmentor spray bar at least partially positioned within the cavity and having a shaft; and
a tuned mass damper having:
a shaft connector member positioned annularly about the shaft and coupled to the shaft,
a cable termination member positioned annularly about the shaft, and
a cable having a plurality of strands, the cable coupled to the shaft connector member and to the cable termination member such that vibration of the shaft is transferred to the plurality of strands of the cable via the shaft connector member and the plurality of strands are configured to generate heat by vibrating against one another.

16. The strut box of claim 15, wherein a gap exists between the cable termination member and the shaft.

17. The strut box of claim 15, wherein the tuned mass damper is tuned to have a damper frequency that reduces vibrations at a resonant frequency of the shaft.

18. The strut box of claim 15, wherein the tuned mass damper is tuned by adjusting at least one of a length of the cable, a mass of the cable termination member, a total number of strands of the cable, a diameter of the cable, or a material of the cable.

19. The strut box of claim 15, wherein each of the shaft connector member, the cable, and the cable termination member include at least one of a nickel-chromium-based alloy or a stainless steel.

20. The strut box of claim 15, wherein the shaft connector member includes a first portion and a second portion configured to be positioned about the shaft and coupled together.

* * * * *